(12) United States Patent
Cao et al.

(10) Patent No.: US 12,056,428 B1
(45) Date of Patent: Aug. 6, 2024

(54) POST-ROUTING PATH DELAY PREDICTION METHOD FOR DIGITAL INTEGRATED CIRCUIT

(71) Applicant: SOUTHEAST UNIVERSITY, Nanjing (CN)

(72) Inventors: Peng Cao, Nanjing (CN); Guoqing He, Nanjing (CN); Tai Yang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/571,739

(22) PCT Filed: Jan. 3, 2023

(86) PCT No.: PCT/CN2023/070101
§ 371 (c)(1),
(2) Date: Dec. 19, 2023

(87) PCT Pub. No.: WO2024/011876
PCT Pub. Date: Jan. 18, 2024

(30) Foreign Application Priority Data

Jul. 14, 2022 (CN) .......................... 202210832373.X (51) Int. Cl.
*G06F 30/3315* (2020.01)
*G06F 119/12* (2020.01)
(52) U.S. Cl.
CPC ...... *G06F 30/3315* (2020.01); *G06F 2119/12* (2020.01)

(58) Field of Classification Search
CPC ... G06F 30/3315; G06F 30/27; G06F 2119/12
See application file for complete search history.

(56) References Cited

U.S. PATENT DOCUMENTS

| 10,915,685 | B1* | 2/2021 | Gupta | G06F 30/327 |
| 11,003,826 | B1* | 5/2021 | Dasasathyan | G06F 30/392 |
| 11,645,440 | B1* | 5/2023 | Bustany | G06F 30/392 |
| | | | | 716/102 |
| 11,836,641 | B2* | 12/2023 | Mamidi | G06F 30/398 |
| 2011/0099531 | A1 | 4/2011 | Celik et al. | |
| 2018/0203956 | A1* | 7/2018 | Ng | G06F 30/39 |
| 2018/0307790 | A1* | 10/2018 | Chuang | G06N 3/08 |

(Continued)

FOREIGN PATENT DOCUMENTS

| CN | 109710981 A | 5/2019 |
| CN | 114117943 A | 3/2022 |

(Continued)

*Primary Examiner* — Nha T Nguyen
(74) *Attorney, Agent, or Firm* — Bayramoglu Law Offices LLC (57) ABSTRACT

A post-routing path delay prediction method for a digital integrated circuit is provided. First, physical design and static timing analysis are performed on a circuit by a commercial physical design tool and a static timing analysis tool, timing and physical information of a path is extracted before routing of the circuit to be used as input features of a prediction model, then the timing and physical correlation of all stages of cells in the path is captured by a transformer network, a predicted post-routing path delay is calibrated by a residual prediction structure, and finally, a final predicted post-routing path delay is output.

7 Claims, 4 Drawing Sheets

(56) References Cited

U.S. PATENT DOCUMENTS

| | | | | |
|---|---|---|---|---|
| 2019/0228126 A1* | 7/2019 | Oh | ................... | G06F 30/3312 |
| 2019/0325092 A1* | 10/2019 | Ren | ................... | G06N 3/082 |
| 2022/0229960 A1* | 7/2022 | Nath | ................... | G06F 30/3315 |
| 2023/0334215 A1* | 10/2023 | Nath | ................... | G06N 3/08 |
| 2023/0376659 A1* | 11/2023 | Lu | ................... | G06F 30/392 |

FOREIGN PATENT DOCUMENTS

| | | |
|---|---|---|
| CN | 114169283 A | 3/2022 |
| CN | 114218870 A | 3/2022 |
| CN | 114298435 A | 4/2022 |
| CN | 115146579 A | 10/2022 |

* cited by examiner

POST-ROUTING PATH DELAY PREDICTION METHOD FOR DIGITAL INTEGRATED CIRCUIT

CROSS-REFERENCE TO THE RELATED APPLICATIONS

This application is the national phase entry of International Application No. PCT/CN2023/070101, filed on Jan. 3, 2023, which is based upon and claims priority to Chinese Patent Application No. 202210832373.X, filed on Jul. 14, 2022, the entire contents of which are incorporated herein by reference.

BACKGROUND OF THE INVENTION

1. Technical Field

The invention belongs to the field of electronic design automation, and relates to a post-routing path delay prediction method for a digital integrated circuit.

2. Description of Related Art

With the increase in the design and fabrication complexity of chips, static timing analysis has become essential for verifying the timing correctness of chips and evaluating whether chips can operate normally under an expected frequency in all design stages of digital integrated circuits. Frequent static timing analysis is executed at all stages of physical design of digital integrated circuits, and the design process is guided according to timing analysis results. With the constant improvement of process nodes, the problem of timing inconsistency between different design stages becomes increasingly serious. For downstream design stages, inaccurate timing estimation will lead to timing divergence and result in design iterations, affecting the design progress; and a large quantity of computing resources will be consumed, leading to a waste of design cost and bringing a great challenge to the design process.

The accuracy and execution speed of timing analysis and optimization throughout all stages of the design process of digital integrated circuits are particularly crucial for timing closure. Especially in the later stage of physical design, the parasitic capacitance introduced by routing and timing inconsistency caused by necessary timing optimization measures pose a challenge to accurate and efficient timing analysis in the earlier stage of physical design. The pessimistic timing estimation strategy commonly used in engineering can lead to over-optimization, resulting in a waste of circuit area, power and design time. Traditional mathematical model-based quick pre-routing timing estimation methods mainly focus on the routing length or delay and ignore the influence of routing on the cell delay and path delay. In recent years, machine learning-based pre-routing timing estimation methods can only predict the delay of a cell and a net after routing, ignore the timing and physical correlation between cells in the path, and acquire a predicted path delay by accumulation, thereby having the defects of error accumulation and higher computing complexity.

BRIEF SUMMARY OF THE INVENTION

Technical problem: The objective of the invention is to provide a post-routing path delay prediction method for a digital integrated circuit, which can accurately predict, at the placement stage before routing, a path delay after routing to effectively guide circuit design and optimization before routing.

Technical solution: The invention provides a post-routing path delay prediction method for a digital integrated circuit, wherein post-routing path delay prediction refers to predicting, at the placement stage in the back-end design process of the digital integrated circuit, a path delay after routing; a path comprises at least two stages of combinational logic cells and does not comprise a sequential logic cell; the method comprises:

S1: performing physical design on a synthesized circuit netlist by means of a physical design tool, wherein the physical design comprises the steps of floorplanning, placement, clock tree synthesis and routing;

S2: extracting sample data, performing static timing analysis on a circuit after placement and routing in S1 respectively by means of a static timing analysis tool, extracting timing and physical information of all the stages of cells from a static timing analysis report and layout information of the circuit after placement to form feature sequences of the path, extracting delay values corresponding to the path from a static timing analysis report of the circuit after routing, and using the delay values as labels;

S3: preprocessing the sample data extracted in S2, discretizing each continuous feature in continuous feature sequences, mapping each discrete feature in discrete feature sequences from a discrete text to a class variable, and performing feature sequence padding to ensure that all the feature sequences have a same length;

S4: establishing a post-routing path delay prediction model, inputting the sample data preprocessed in S3 to an encoder network, merging a pre-routing path delay and output data of the encoder network, and performing dimension reduction to obtain a predicted pre-routing and post-routing path delay residual; adding the pre-routing path delay and the predicted pre-routing and post-routing path delay residual to obtain a predicted post-routing path delay finally; and S5: training and verifying the model established in S4, randomly classifying the sample data preprocessed in S3 as training set data and test set data, training the model with the training set data, and verifying the prediction accuracy and efficiency of the model with the test set data.

In S2, static timing analysis is performed on the circuit after the placement in S1, and timing and physical information of all the stages of cell in the path is extracted from the static timing analysis report and the layout information to form feature sequences of the path. Timing information of each cell comprises an input transition time of the cell, an output transition time of the cell, a cell delay of the cell, an input signal polarity of the cell and an output signal polarity of the cell; and the physical information of each cell comprises the capacitance of an input pin of the cell, the total output load capacitance of the cell, the number of fan-outs of the cell, the type of the cell, the distance between an output pin of the cell and an input pin of the next stage of cell, and the distance between the input pin of the cell and the input pin of the next stage of cell.

S3 specifically comprises:

S31: Each continuous feature in the continuous feature sequences is discretized through a binning method. The continuous feature sequences comprise a sequence formed by the input transition time of all the stages of cells in the path, a sequence formed by the output transition time of all the stages of cells, a sequence formed by the cell delay of the all the stages of cells, a sequence formed by the capacitance of the input pins of all the stages of cells, a sequence formed by the total output load capacitance of all the stages of cell, a sequence formed by the distance between the output pin of each stage of cell and the input pin of the next stage of cell, and a sequence formed by the distance between the input pin of each stage of cell and the input pin of the next stage of cell. The binning method determines the rounding precision of feature values by observing a median, a maximum value and a minimal value of the features and a physical significance of the feature values. If the value of one continuous feature in the continuous feature sequence is x, the value of the continuous feature is x' after being processed through the binning method, where m is a multiplying factor of the value of the continuous feature, round( ) refers to returning to an integer closest to an input value, and a calculation formula of the binning method is formula (1):

$$x' = \text{round}(m \cdot x) \tag{1}$$

S32: Each discrete feature in the discrete feature sequences is mapped from a discrete text to a class variable through a tokenizing method. The discrete feature sequences comprise a sequence formed by the input signal polarity of each stage of cell in the path, a sequence formed by the output signal polarity of each stage of cell, a sequence formed by the number of fan-outs of each stage of cell, and a sequence formed by the type of each stage of cell. The tokenizing method trains a mapping dictionary first and then obtains a mapped class variable sequence based on the mapping dictionary.

S33: Feature sequence padding is performed to ensure that the feature sequences have the same length. A maximum feature sequence length of the training set data is set as max_len, and feature sequences with a length less than max_lenare filled with "0" at the end until the length of the feature sequences is max_len. Feature sequences with a length greater than max_len in the test set data are truncated to ensure that the length of the feature sequences is max_len.

In S4, the encoder network is a transformer network, which comprises input embedding and positional encoding, a multi-head self-attention mechanism, a fully connected feedforward network, and adding and normalization. S4 specifically comprises:

S41: converting an input feature sequence with a dimension of (samples,mar_len) into a tensor with a dimension of (samples,max_len,$\dim_k$), wherein samples is the number of samples, max_lenis a maximum path length, $\dim_k$ is a designated word vector dimension of a feature in an embedding layer, k=1, 2, . . . , n, and n is the number of input feature sequences; in the positional encoding process, trigonometric functions shown by formula (2) and formula (3) are used to assist the network in understanding the positional relationship of features of all the stages of cells in the path, wherein posrepresents the position of a feature value in the sequence, pos=1, 2, . . . , max_len, m is a dimensional index of a positional encoding sequence of the feature, mom, 1, . . . , $\dim_k/2$-1, sine encoding is used for feature sequences with an even dimension (2m), cosine encoding is used for feature sequences with an odd dimension (2m+1), the dimension of the tensor output after positional encoding is (samples,max_len,$\dim_k$), that is, a coded value at 2m of the positional encoding sequence of the feature value in pos of the feature sequence is $PE_{(pos,2m)}$, and a coded value at 2m+1 of the positional encoding sequence of the feature value in pos of the feature sequence is $PE_{(pos,2m+1)}$; for each feature sequence, the tensor output after positional encoding is added with a tensor output after input embedding, such that n new tensors with a dimension of (samples, max_len,$\dim_k$) are obtained;

$$PE_{(pos,2m)} = \sin(pos/10000^{2m/dim_k}) \tag{2}$$

$$PE_{(pos,2m+1)} = \cos(pos/10000^{2m/dim_k}) \tag{3}$$

S42: merging the n new tensors obtained in S41 to obtain a tensor with a dimension of (samples,max_len,dim), which is used as an input X of the multi-head self-attention mechanism, wherein $\dim = \dim_1 + \dim_2 + \ldots + \dim_n$, a $j^{th}$ row vector of X is a comprehensive feature expression of the timing and physical information of a $j^{th}$ stage of cell in the path, and j=1, 2, . . . , max_len; performing linear transform on Xh times by means of three trainable matrices $W_i^Q$, $W_i^K$ and $W_i^V$ respectively to obtain h groups of matrices $Q_i$, $K_i$ and $V_i$ with a word vector dimension of $d_k$=dim/h, wherein i=1, 2, . . . , h, h is the number of heads of the self-attention mechanism, and $Q_i$, $K_i$ and $V_i$ represent query, key and value; performing an attention function on the h groups of matrices $Q_i$, $K_i$ and $V_i$ parallelly, wherein a calculation formula of the dot product-based attention mechanism is formula (4); first, calculating a dot product of transposes of $Q_i$ and $K_i$ and dividing the dot product by a coefficient $d_k^{1/2}$, then performing an operation by means of a softmax transfer function to obtain a weight matrix C, and finally, calculating a dot product of the weight matrix C and $V_i$ to obtain a matrix Z, with a dimension of $d_k$, which is a calculation result Attention($Q_i$, $K_i$, $V_i$) of the attention mechanism, wherein an element in an $a^{th}$ row and a $b^{th}$ column is a timing and physical correlation between an $a^{th}$ stage of cell and a $b^{th}$ stage of cell in the path, a=1, 2, . . . . max_len, h=1, 2, . . . , max_len, and the number of row vectors of the matrix Z is the same as that of the input X, so the row vectors of the matrix Z have cell timing and physical meanings similar to those of X;

$$\text{Attention}(Q_i, K_i, V_i) = \text{softmax}\left(\frac{Q_i K_i^T}{\sqrt{d_k}}\right) V_i \tag{4}$$

merging calculation results $\text{head}_i$ of the h-head attention mechanism, and performing linear transform is performed by means of a trainable matrix $W^O$ to obtain an output MultiHead(X) of the multi-head self-attention mechanism, wherein i=1, 2, . . . , h, and a calculation formula of the multi-head self-attention mechanism is formula (5), in which X is the input of the multi-head self-attention mechanism, $W_i^Q$, $W_i^K$, $W_i^V$ and $W^O$ are trainable matrices, and l=1, 2, . . . , h;

$$\text{MultiHead}(X) = \text{Concat}(\text{head}_1, \text{head}_2, \ldots, \text{head}_h) W^O$$
$$\text{head}_1 = \text{Attention}(XW_i^Q, XW_i^K, XW_i^V) \tag{5}$$

S43: adding the input X and the output MultiHead(A) of the multi-head self-attention mechanism obtained in S42, and performing normalization to avoid gradient vanishing and gradient explosion, wherein an output of a normalization layer of the multi-head self-attention mechanism is expressed by formula (6), and LayerNorm( ) is an output function of the normalization layer;

$$\text{LayerNorm}(X + \text{MultiHead}(x)) \tag{6}$$

S44: inputting the output, normalized in S43, of the multi-head self-attention mechanism to the fully connected feedforward neural network with nerve cells of two adjacent layers being fully connected; first, performing linear transform on the input, then allowing the input to pass through a rectified linear cell max(0,s), and finally, performing linear transform again, wherein s is an input of the rectified linear cell; t is an input of the fully connected feedforward neural network, $W_1$, $b_1$ and $W_2$, $b_2$ are parameters of the two times of linear transform respectively, and an output calculation formula of the fully connected feedforward neural network is formula (7):

$$FFN(1)=\max(0, tW_1+b_1)W_2+b_2 \quad (7)$$

S45: adding the input t and an output FFN(t) of the fully connected feedforward neural network obtained in S44, and performing normalization to avoid gradient vanishing and gradient explosion, wherein an output of a normalization layer of the fully connected feedforward neural network is expressed by formula (8), and LayerNorm( ) is an output function of the normalization layer; and $$\text{LayerNorm}(t+FNN(t)) \quad (8)$$

S46: inputting the output of the normalization layer of the fully connected feedforward neural network obtained in S45 to a pooling layer, flattening three-dimensional data into two-dimensional data, inputting the two-dimensional data to a fully connected layer for nonlinear transform, and randomly dropping part of information by means of a dropout function to prevent over-fitting; then, merging the data and the pre-routing path delay which is subjected to nonlinear transform and information dropout, and nonlinearly transforming merged data into one-dimensional data to obtain the pre-routing and post-routing path delay residual; and finally, adding the pre-routing path delay and the pre-routing and post-routing path delay residual to obtain the final predicted post-routing path delay.

Beneficial effects: the post-routing path delay prediction method for a digital integrated circuit disclosed by the invention captures the timing and physical correlation between cells in a path by means of the self-attention mechanism of a transformer network, thus being able to directly predict a path delay; the predicted post-routing path delay is calibrated by means of a residual prediction structure, thus improving the prediction accuracy; compared with traditional static timing analysis processes, the post-routing path delay prediction method provided by the invention can accurately and efficiently predict a post-routing path delay before routing to effectively guide pre-routing circuit design and optimization, thus having great significance in accelerating the design process of digital integrated circuits.

DETAILED DESCRIPTION OF THE INVENTION

The technical solution of the invention will be further introduced below in conjunction with specific embodiments.

Figure 1:
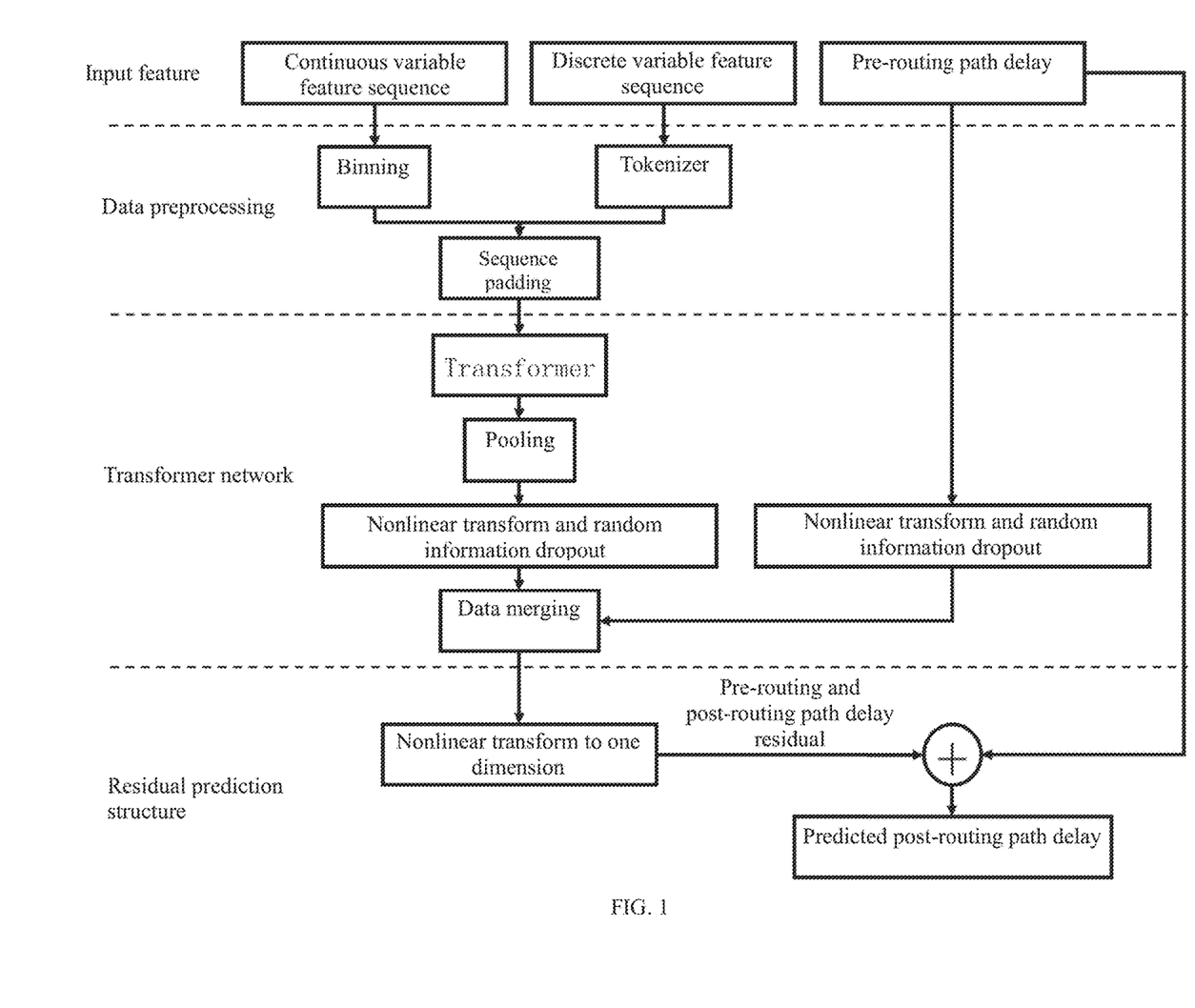
FIG. 1 is a schematic framework diagram of post-routing path delay prediction of a digital integrated circuit according to the invention.

The invention provides a post-routing path delay prediction method for a digital integrated circuit, wherein post-routing path delay prediction refers to predicting, at the placement stage in the back-end design process of the digital integrated circuit, a path delay after routing; a path comprises at least two stages of combinational logic cells and does not comprise a sequential logic cell; the method comprises the following steps:

S1: physical design is performed on a synthesized circuit netlist by means of a physical design tool, wherein the physical design comprises the steps of floorplanning, placement, clock tree synthesis and routing. For example, physical design is performed on nine synthesized ISCAS and OpenCores circuits by means of IC Complierunder an SMIC 40 nm process, a TT process corner, a 1.1 V voltage and a temperature of 25° C.

S2: sample data is extracted, static timing analysis is performed on a circuit after placement and routing in S1 respectively by means of a static timing analysis tool, timing and physical information of all the stages of cells is extracted from a static timing analysis report and layout information of the circuit after placement to form feature sequences of the path, and delay values corresponding to the path are extracted from a static timing analysis report of the circuit after routing and used as labels. For example, under the SMIC 40 nm process, the TT process corner, the 1.1 V voltage and the temperature of 25° C., a clock cycle is set as 5 ns, and static timing analysis is performed on the nine ISCASand OpenCores circuits after placement and routing by means of PrimeTime.

S3: the sample data extracted in S2 is preprocessed, each continuous feature in continuous feature sequences is discretized through a binning method, each discrete feature in discrete feature sequences is mapped from a discrete text to a class variable through a tokenizing method, and the feature sequence are filled to ensure that all the feature sequences have a same length. For example, the binning method, the tokenizing method and sequence padding are implemented by means of an open-source artificial neural network library Keras compiled by Python.

Figure 2:
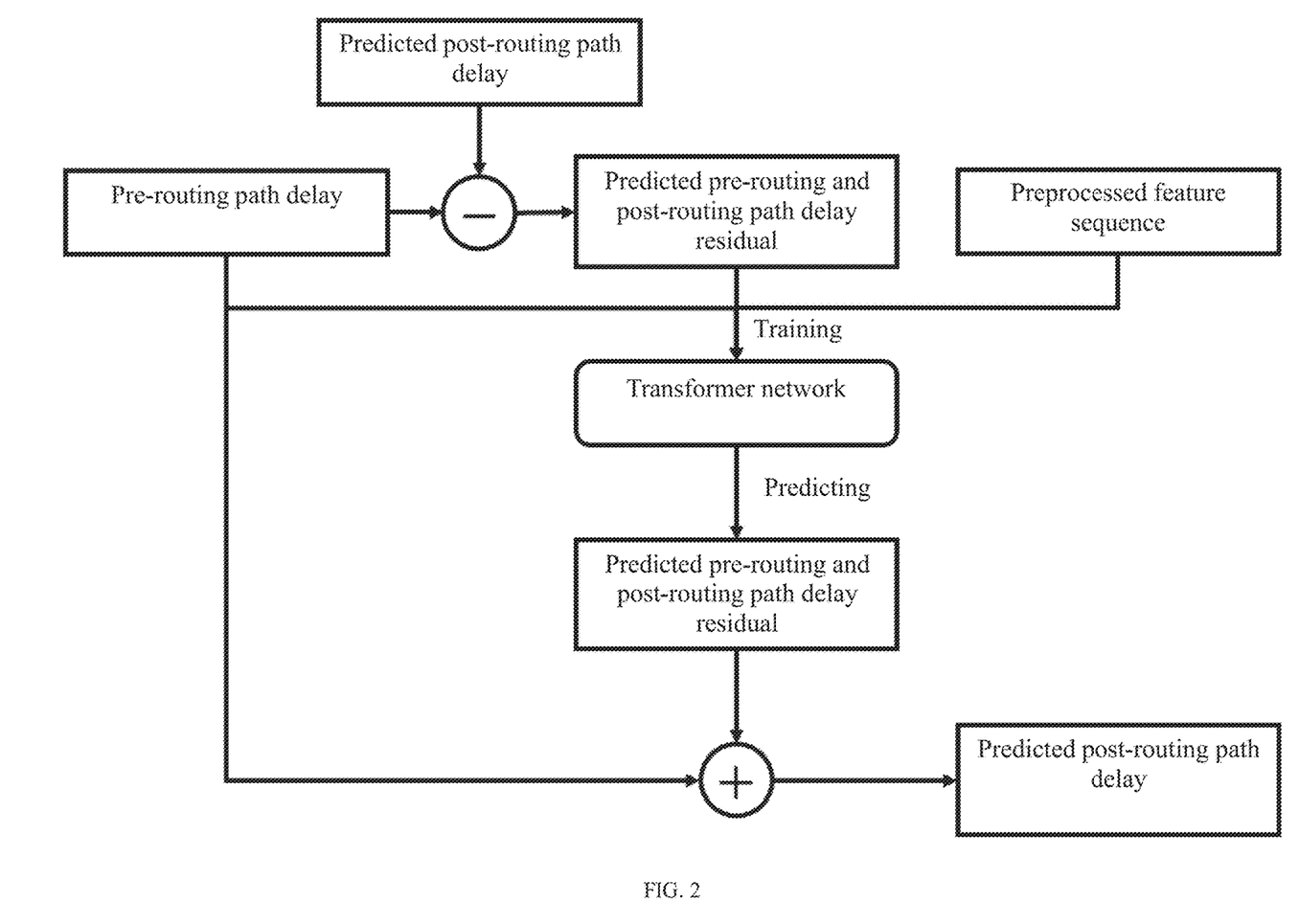
FIG. 2 is a schematic structural view of post-routing path delay residual prediction of a digital integrated circuit according to the invention.

S4: a post-routing path delay prediction model is established, the sample data preprocessed in S3 is input to a transformer network, a pre-routing path delay and output data of the transformer network are merged, and dimension reduction is performed to obtain a predicted pre-routing and post-routing path delay residual; and the pre-routing path delay and the predicted pre-routing and post-routing path delay residual are added to obtain a predicted post-routing path delay finally. For example, the post-routing path delay prediction model is established by means of the open-source artificial neural network library Keras and a machine learning library Scikit-learn compiled by Python.

S5: the model established in S4 is trained and verified. Specifically, the sample data preprocessed in S3 is randomly classified as training set data and test set data, the model is trained with the training set data, and the prediction accuracy and efficiency of the model are verified with the test set data. For example, 80% of all paths extracted from six of the nine ISCAS and OpenCores circuits are randomly selected as training set data for training the model, and the remaining 20% of the paths extracted from the six circuits are used for verifying the prediction performance of the model on the known circuits, and all paths extracted from the remaining three circuits are used for verifying the prediction performance of the model on an unknown circuit. During training, an Adam optimizer is used, the learning rate is 0.001, the number of training batches is 1080, and the loss function is the root-mean-square error (RMSE).

In S2, static timing analysis is performed on the circuit after placement in S1, and the timing and physical information of all the stages of cell in the path is extracted from the static timing analysis report and the layout information to form the feature sequences of the path. Timing information of each cell comprises an input transition time of the cell, an output transition time of the cell, a cell delay of the cell, an input signal polarity of the cell and an output signal polarity of the cell, the physical information of each cell comprises the capacitance of an input pin of the cell, the total output load capacitance of the cell, the number of fan-outs of the cell, the type of the cell, the distance between an output pin of the cell and an input pin of the next stage of cell, and the distance between the input pin of the cell and the input pin of the next stage of cell.

S3 specifically comprises:

S31: Each continuous feature in the continuous feature sequences is discretized through the binning method. The continuous feature sequences comprise a sequence formed by the input transition time of all the stages of cells in the path, a sequence formed by the output transition time of all the stages of cells, a sequence formed by the cell delay of the all the stages of cells, a sequence formed by the capacitance of the input pins of all the stages of cells, a sequence formed by the total output load capacitance of all the stages of cell, a sequence formed by the distance between the output pin of each stage of cell and the input pin of the next stage of cell, and a sequence formed by the distance between the input pin of each stage of cell and the input pin of the next stage of cell. The binning method determines the rounding precision of feature values by observing a median, a maximum value and a minimal value of the features and a physical significance of the feature values. If the value of one continuous feature in the continuous feature sequence is x, the value of the continuous feature in the continuous feature sequence is x' after being processed by the binning method, where m is a multiplying factor of the value of the continuous feature, round( ) refers to returning to an integer closest to an input value, and a calculation formula of the binning method is formula (1):

$$x'=\text{round}(m \cdot x) \quad (1)$$

S32: Each discrete feature in the discrete feature sequences is mapped from a discrete text to a class variable through the tokenizing method. The discrete feature sequences comprise a sequence formed by the input signal polarity of each stage of cell in the path, a sequence formed by the output signal polarity of each stage of cell in the path, a sequence formed by the number of fan-outs of each stage of cell in the path, and a sequence formed by the type of each stage of cell in the path. According to the tokenizing method, a mapping dictionary is trained first, and then a mapped class variable sequence is obtained based on the mapping dictionary. For example, the tokenizing method is implemented by means of Tokenizer of the open-source artificial neural network library Keras compiled by Python, the mapping dictionary is trained by fit on texts, and then the mapped class variable sequence is obtained by texts_to_sequences.

S33: Feature sequence padding is performed to ensure that the feature sequences have the same length. A maximum feature sequence length of the training set data is set as max_len, and feature sequences with a length less than max_len are filled with "0" at the end until the length of the feature sequences is max_len. Feature sequences with a length greater than max_len in the test set data are truncated to ensure that the length of the feature sequences is max_Len. For example, feature sequence filing is completed by means of pad sequences of the open-source artificial neural network library Keras compiled by Python.

Figure 3:
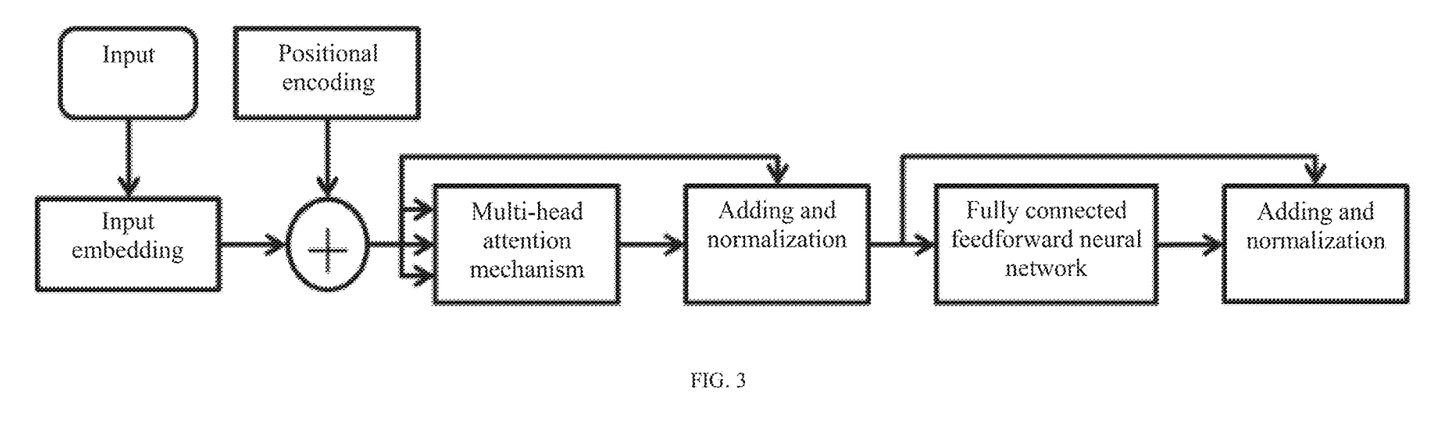
FIG. 3 is a schematic structural diagram of a transformer network.

In S4, the transformer network comprises input embedding and positional encoding, a multi-head self-attention mechanism, a fully connected feedforward network, and adding and normalization. S4 specifically comprises the following steps:

S41: an input feature sequence with a dimension of (samples,max_len) is converted into a tensor with a dimension of (samples,max_len,$\dim_k$), wherein samples is the number of samples, max_len is a maximum path length, $\dim_k$ is a designated word vector dimension of a kth feature in an embedding layer, k=1, 2, . . . , n, and n is the number of input feature sequences. In the positional encoding process, trigonometric functions shown by formula (2) and formula (3) are used to assist the network in understanding the positional relationship of features of all the stages of cells in the path, wherein pos represents the position of feature value in the sequence, pos-1, 2, . . . , max_len, m is a dimensional index of a positional encoding sequence of the feature value, and m om, 1, . . . , $\dim_k/2-1$; sine encoding is used for feature sequences with an even dimension (2m), cosine encoding is used for feature sequences with an odd dimension (2m+1), the dimension of the tensor output after positional encoding is (samples,max_len,$\dim_k$), that is, a coded value at 2m of the positional encoding sequence of the feature value in pos of the feature sequence is $PEA_{(pos,2m)}$, a coded value at 2m+1 of the positional encoding sequence of the feature value in pos of the feature sequence is $PE_{(pos,2m+1)}$. For each feature sequence, the tensor output after positional encoding is added with a tensor output after input embedding, such that n new tensors with a dimension of (samples, max_len, $\dim_k$) are obtained. For example, the maximum path length max_len is 21, and the designated word vector dimension dim in the embedding layer is 16.

$$PE_{(pos,2m)}=\sin(pos/10000^{2m/dim_k}) \quad (2)$$

$$PE_{(pos,2m+1)}=\cos(pos/10000^{2m/dim_k}) \quad (3)$$

Figure 4:
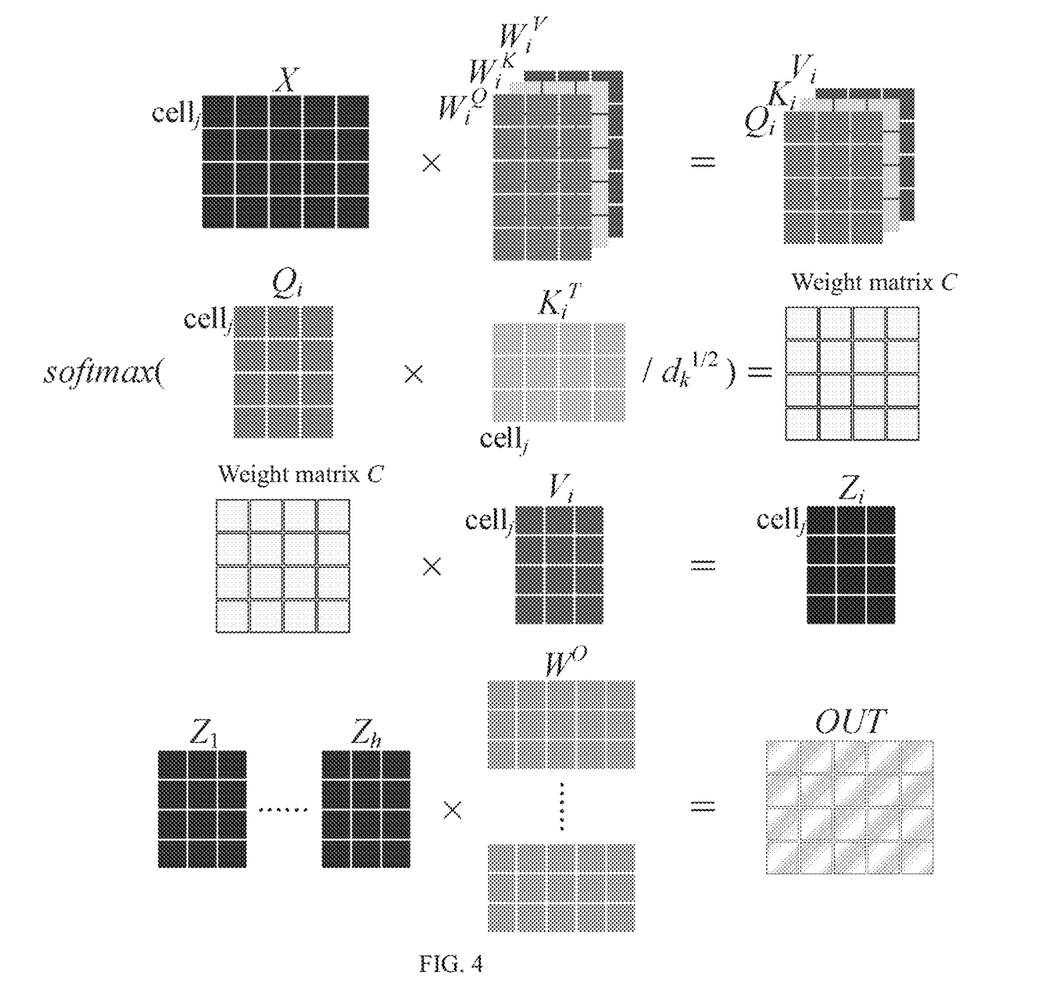
FIG. 4 is a schematic diagram of the computing process of a multi-head self-attention mechanism.

S42; the n new tensors obtained in S41 are merged to obtain a tensor with a dimension of (samples,max_len,dim), which is used as an input X of the multi-head self-attention mechanism, wherein dim=$\dim_1$+$\dim_2$+ . . . +$\dim_n$. A $j^{th}$ row vector of X is a comprehensive feature expression of the timing and physical information of a $j^{th}$ stage of cell in the path, and j=1, 2, . . . , max_len. Linear transform is performed on X h times by means of three trainable matrices $W_i^Q$, $W_i^K$ and $W_i^V$ respectively to obtain h groups of matrices $Q_i$, $K_i$ and $V_i$ with a word vector dimension of $d_k$=dim/h, wherein i=1, 2, . . . , h, h is the number of heads of the self-attention mechanism, and Q, K and V represent query, key and value. An attention function is performed on then groups of matrices $Q_i$, $K_i$ and $V_i$ parallelly, wherein a calculation formula of the dot product-based attention mechanism is formula (4). First, a dot product of transposes of $Q_i$ and $K_i$ is calculated first and is then divided by a coefficient $d_k^{1/2}$, then an operation is performed by means of a softmax transfer function to obtain a weight matrix C, and finally, a dot product of the weight matrix C and V is calculated to obtain a matrix Z, with a dimension of dx, which is a calculation result Attention($Q_i$, $K_i$, $V_i$) of the attention mechanism. An element in an $a^{th}$ row and a $b^{th}$ column of the weight matrix C is a timing and physical correlation of an $a^{th}$ stage of cell and a $b^{th}$ stage of cell in the path, a=1, 2, . . . , max_len, b=1, 2, . . . , max_len, and the number of row vectors of the matrix Z, is the same as that of the input X, so the row vectors of the matrix Z, have cell timing and physical meanings similar to those of X. For example, the number h of heads is set to 2, and the dimension $d_k$ of each word vector obtained after linear transform is 8.

$$\text{Attention}(Q_i, K_i, V_i) = \text{softmax}\left(\frac{Q_i K_i^T}{\sqrt{d_k}}\right) V_i \quad (4)$$

Calculation results $\text{head}_i$ of the h-head attention mechanism are merged, and linear transform is performed by means of a trainable matrix W'r' to obtain an output MultiHead(X) of the multi-head self-attention mechanism, wherein l=1, 2, ..., h, and a calculation formula of the multi-head self-attention mechanism is formula (5), in which X is the input of the multi-head self-attention mechanism, $W_i^Q$, $W_i^K$, $W_i^V$ and $W^O$ are trainable matrices, and i=1, 2, ..., h.

$$\text{MultiHead}(X) = \text{Concat}(\text{head}_1, \text{head}_2, \ldots, \text{head}_h) W^O$$
$$\text{head}_l = \text{Attention}(X W_i^Q, X W_i^K, X W_i^V) \quad (5)$$

S43: the input X and the output MultiHead(X) of the multi-head self-attention mechanism obtained in S42 are added, and normalization is performed to avoid gradient vanishing and gradient explosion, wherein an output of a normalization layer of the multi-head self-attention mechanism is expressed by formula (6), and LayerNorm( ) is an output function of the normalization layer;

$$\text{LayerNorm}(X + \text{MultiHead}(X)) \quad (6)$$

S44: the output, normalized in S43, of the multi-head self-attention mechanism is input to the fully connected feedforward neural network with two adjacent layers of never cells being fully connected. First, linear transform is performed on the input, then the input passes through a rectified linear cell max(0,s), and finally, linear transform is performed again, where s is an input of the rectified linear cell. t is an input of the fully connected feedforward neural network, $W_1, b_1$ and $W_2, b_2$ are parameters of the two times of linear transform respectively, and an output calculation formula of the fully connected feedforward neural network is formula (7):

$$\text{FFN}(t) = \max(0, t W_1 + b_1) W_2 + b_2 \quad (7)$$

S45: the input t and an output FFN(t) of the fully connected feedforward neural network obtained in S44 are added, and normalization is performed to avoid gradient vanishing and gradient explosion, wherein an output of a normalization layer of the fully connected feedforward neural network is expressed by formula (8), and LayerNorm( ) is an output function of the normalization layer.

$$\text{LayerNorm}(t + FNN(t)) \quad (8)$$

S46: the output of the normalization layer of the fully connected feedforward neural network obtained in S45 is input to a polling layer, three-dimensional data is flattened into two-dimensional data, the two-dimensional data is input to a fully connected layer for nonlinear transform, and part of information is randomly dropped by means of a dropout function to prevent over-fitting; then, the data and the pre-routing path delay which is subjected to nonlinear transform and information dropout are merged, and merged data are nonlinearly transformed into one-dimensional data to obtain the pre-routing and post-routing path delay residual; and finally, the pre-routing path delay and the pre-routing and post-routing path delay residual are added to obtain the final predicted post-routing path delay.

What is claimed is:

1. A post-routing path delay prediction method for a digital integrated circuit, comprising:
    S1: performing physical design on a synthesized circuit netlist by means of a physical design tool, wherein the physical design comprises the steps of floorplanning, placement, clock tree synthesis and routing;
    S2: performing static timing analysis on a circuit after placement and routing in S1 respectively, extracting timing and physical information of all stages of cells in a path from a static timing analysis report and layout information of the circuit after placement to form feature sequences of the path, extracting delay values corresponding to the path from a static timing analysis report of the circuit after routing, and using the delay values as labels;
    S3: preprocessing sample data extracted in S2, discretizing each continuous feature in continuous feature sequences, mapping each discrete feature in discrete feature sequences from a discrete text to a class variable, and performing feature sequence padding to ensure that all the feature sequences have a same length;
    S4: establishing a post-routing path delay prediction model, inputting the sample data preprocessed in S3 to an encoder network, merging a pre-routing path delay and output data of the encoder network, and performing dimension reduction to obtain a predicted pre-routing and post-routing path delay residual; adding the pre-routing path delay and the predicted pre-routing and post-routing path delay residual to obtain a predicted post-routing path delay finally; and
    S5: training and verifying the model established in S4, randomly classifying the sample data preprocessed in S3 as training set data and test set data, training the model with the training set data, and verifying prediction accuracy and efficiency of the model with the test set data.

2. The post-routing path delay prediction method for the digital integrated circuit according to claim 1, wherein timing information of each cell comprises an input transition time of the cell, an output transition time of the cell, a cell delay of the cell, an input signal polarity of the cell and an output signal polarity of the cell; and the physical information of each cell comprises a capacitance of an input pin of the cell, a total output load capacitance of the cell, the number of fan-outs of the cell, a type of the cell, a distance between an output pin of the cell and an input pin of the next stage of cell, and a distance between the input pin of the cell and the input pin of the next stage of cell.

3. The post-routing path delay prediction method for the digital integrated circuit according to claim 1, wherein each continuous feature in the continuous feature sequences is discretized through a binning method; the continuous feature sequences comprise a sequence formed by an input transition time of all the stages of cells in the path, a sequence formed by an output transition time of all the stages of cells, a sequence formed by a cell delay of the all the stages of cells, a sequence formed by a capacitance of input pins of all the stages of cells, a sequence formed by a total output load capacitance of all the stages of cell, a sequence formed by a distance between an output pin of each stage of cell and an input pin of the next stage of cell, and a sequence formed by a distance between an input pin of each stage of cell and the input pin of the next stage of cell; the binning method determines a rounding precision of feature values by observing a median, a maximum value and a minimal value of features and a physical significance of the feature values; if the value of one continuous feature in the continuous feature sequence is x, the value of the continuous feature is x' after being processed through the binning method, m is a multiplying factor of the value of the continuous feature, round( ) refers to returning to an integer closest to an input value, and a calculation formula of the binning method is formula (1):

$$x'=\text{round}(m \cdot x) \tag{1}$$

4. The post-routing path delay prediction method for the digital integrated circuit according to claim 1, wherein each discrete feature in the discrete feature sequences is mapped from a discrete text to a class variable through a tokenizing method; the discrete feature sequences comprise a sequence formed by an input signal polarity of each stage of cell in the path, a sequence formed by an output signal polarity of each stage of cell, a sequence formed by the number of fan-outs of each stage of cell, and a sequence formed by a type of each stage of cell; and the tokenizing method trains a mapping dictionary first and then obtains a mapped class variable sequence based on the mapping dictionary.

5. The post-routing path delay prediction method for the digital integrated circuit according to claim 1, wherein the step of performing feature sequence padding to ensure that all the feature sequences have the same length specifically comprises: setting a maximum feature sequence length of the training set data as max_len, and padding feature sequences with a length less than max_len with "0" at the end until the length of the feature sequences is max_len, and truncating feature sequences with a length greater than max_len in the test set data to ensure that the length of the feature sequences is max_len.

6. The post-routing path delay prediction method for the digital integrated circuit according to claim 1, wherein the encoder network is a transformer network.

7. The post-routing path delay prediction method for the digital integrated circuit according to claim 6, wherein transformer network comprises input embedding and positional encoding, a multi-head self-attention mechanism, a fully connected feedforward network, and adding and normalization; S4 specifically comprises:

S41: converting an input feature sequence with a dimension of (samples,max_len) into a tensor with a dimension of (samples,max_len,dimr), wherein samples is the number of samples, max_len is a maximum path length, dunk is a designated word vector dimension of a $k^{th}$ feature in an embedding layer, k=1, 2, . . . , n, and n is the number of input feature sequences; in the positional encoding process, trigonometric functions shown by formula (2) and formula (3) are used to assist the network in understanding a positional relationship of features of all the stages of cells in the path, wherein pos represents a position of a feature value in the sequence, pos=1, 2, . . . , max_len, m is a dimensional index of a positional encoding sequence of the feature, m=0, 1 . . . . , $\dim_k/2-1$, sine encoding is used for feature sequences with an even dimension, cosine encoding is used for feature sequences with an odd dimension, the dimension of the tensor output after positional encoding is (samples,max_len,$\dim_k$), that is, a coded value at 2m of the positional encoding sequence of the feature value in pos of the feature sequence is $PE_{(pos,2m)}$, and a coded value at 2m+1 of the positional encoding sequence of the feature value in pos of the feature sequence is $PE_{(pos,2m+1)}$; for each feature sequence, the tensor output after positional encoding is added with a tensor output after input embedding, such that n new tensors with a dimension of (samples, max_len,$\dim_k$) are obtained;

$$PE_{(pos,2m)}=\sin(pos/10000^{2m/dim_k}) \tag{2}$$

$$PE_{(pos,2m+1)}=\cos(pos/10000^{2m/dim_k}) \tag{3}$$

S42: merging the n new tensors obtained in S41 to obtain a tensor with a dimension of (samples,max_len,dim), which is used as an input X of the multi-head self-attention mechanism, wherein $\dim=\dim_1+\dim_2+ \ldots +\dim_n$, a $j^{th}$ row vector of X is a comprehensive feature expression of the timing and physical information of a $j^{th}$ stage of cell in the path, and j=1, 2, . . . , max_len; performing linear transform on Xh times by means of three trainable matrices $W_i^Q$, $W_i^K$ and $W_i^V$ respectively to obtain h groups of matrices $Q_i$, $K_i$ and $V_i$ with a word vector dimension of $d_k$=dim/h, wherein i=1, 2, . . . , h, h is the number of heads of the self-attention mechanism, and Q, K and V represent query, key and value; performing an attention function on the h groups of matrices $Q_i$, $K_i$, and $V_i$ parallelly, wherein a calculation formula of a dot product-based attention mechanism is formula (4); first, calculating a dot product of transposes of $Q_i$ and $K_i$ and dividing the dot product by a coefficient $d_k^{1/2}$, then performing an operation by means of a softmax transfer function to obtain a weight matrix C, and finally, calculating a dot product of the weight matrix C and $V_i$ to obtain a matrix $Z_i$ with a dimension of $d_k$, which is a calculation result Attention $(Q_i, K_i, V_i)$ of the attention mechanism, wherein an element in an $a^{th}$ row and a $b^{th}$ column is a timing and physical correlation between an $a^{th}$ stage of cell and a $b^{th}$ stage of cell in the path, a=1, 2, . . . , max_len, b=1, 2, . . . , max_len, and the number of row vectors of the matrix $Z_i$ is the same as that of the input X, so the row vectors of the matrix $Z_i$ have cell timing and physical meanings similar to those of X;

$$\text{Attention}(Q_i, K_i, V_i) = \text{softmax}\left(\frac{Q_i K_i^T}{\sqrt{d_k}}\right)V_i \tag{4}$$

merging calculation results $head_i$ of the h-head attention mechanism, and performing linear transform is performed by means of a trainable matrix $W^O$ to obtain an output MultiHead(X) of the multi-head self-attention mechanism, wherein i=1, 2, . . . , h, and a calculation formula of the multi-head self-attention mechanism is formula (5), in which X is the input of the multi-head self-attention mechanism, $W_i^Q$, $W_i^K$, $W_i^V$ and $W^O$ are trainable matrices, and i=1, 2, . . . , h, $$\begin{aligned}\text{MultiHead}(X)&=\text{Concat}(head_1, head_2, \ldots, head_h)W^O \\ head_i&=\text{Attention}(XW_i^Q, XW_i^K, XW_i^V)\end{aligned} \tag{5}$$

S43: adding the input X and the output MultiHead(X) of the multi-head self-attention mechanism obtained in S42, and performing normalization to avoid gradient vanishing and gradient explosion, wherein an output of a normalization layer of the multi-head self-attention mechanism is expressed by formula (6), and LayerNorm( ) is an output function of the normalization layer;

$$\text{LayerNorm}(X+\text{MultiHead}(X)) \quad (6)$$

S44: inputting the output, normalized in S43, of the multi-head self-attention mechanism to the fully connected feedforward neural network with two adjacent layers of never cells being fully connected; first, performing linear transform on the input, then allowing the input to pass through a rectified linear cell max(0, s), and finally, performing linear transform again, wherein s is an input of the rectified linear cell; t is an input of the fully connected feedforward neural network, $W_r$, $b_1$ and $W_2$, $b_2$ are parameters of the two times of linear transform respectively, and an output calculation formula of the fully connected feedforward neural network is formula (7):

$$FFN(t)=\max(0,tW_1+b_1)W_2+b_2 \quad (7)$$

S45: adding the input t and an output FFN(t) of the fully connected feedforward neural network obtained in S44, and performing normalization to avoid gradient vanishing and gradient explosion, wherein an output of a normalization layer of the fully connected feedforward neural network is expressed by formula (8), and LayerNorm( ) is an output function of the normalization layer; and $$\text{LayerNorm}(t+FNN(t)) \quad (8)$$

S46: inputting the output of the normalization layer of the fully connected feedforward neural network obtained in S45 to a pooling layer, flattening three-dimensional data into two-dimensional data, inputting the two-dimensional data to a fully connected layer for nonlinear transform, and randomly dropping part of information by means of a dropout function to prevent overfitting; then, merging the data and the pre-routing path delay which is subjected to nonlinear transform and information dropout, and nonlinearly transforming merged data into one-dimensional data to obtain the pre-routing and post-routing path delay residual, and finally, adding the pre-routing path delay and the pre-routing and post-routing path delay residual to obtain the final predicted post-routing path delay.

\* \* \* \* \*